July 31, 1934.  P. J. WILSON, JR  1,968,275
TREATMENT OF GAS
Filed March 28, 1931
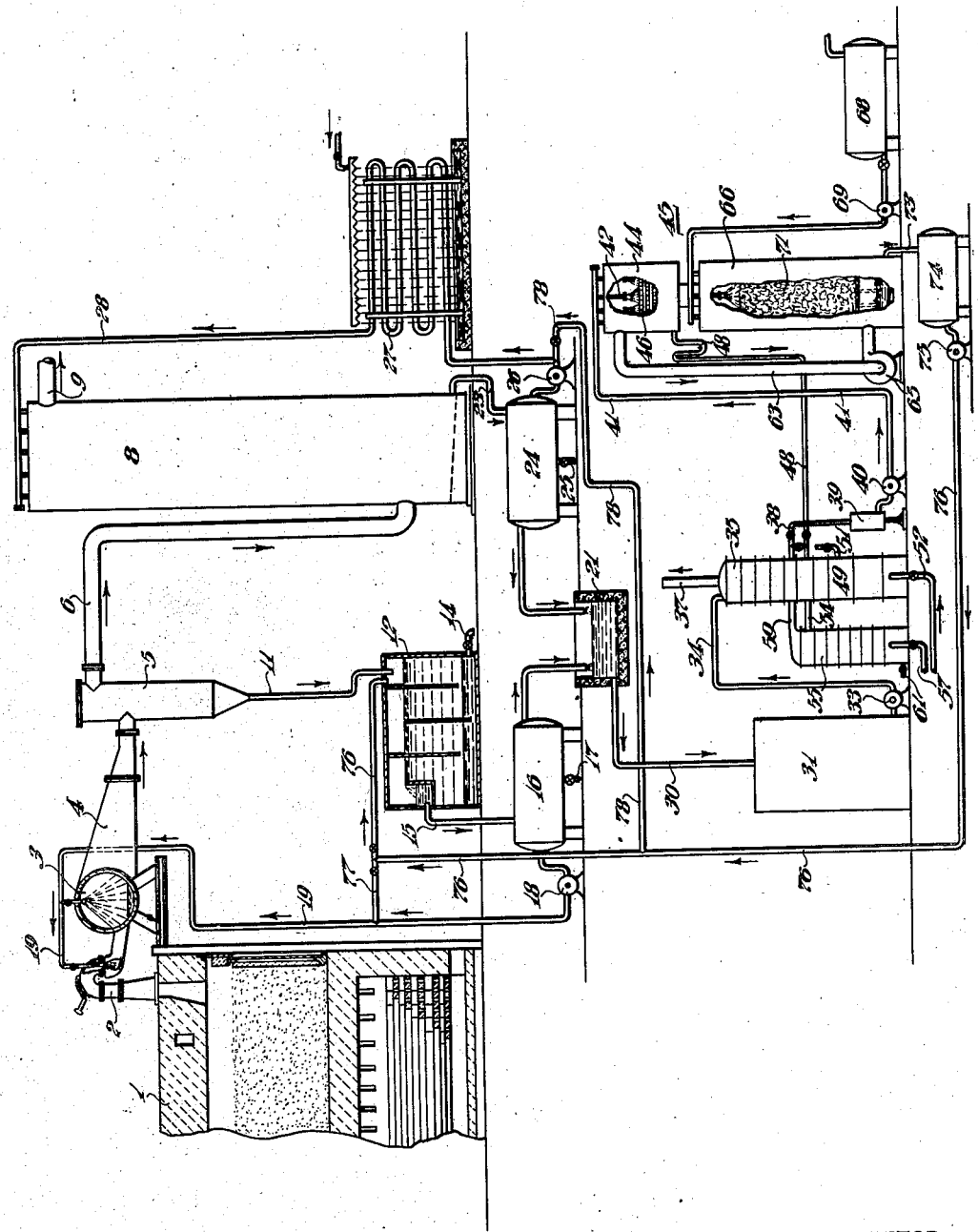
INVENTOR.
Philip J. Wilson, Jr.
BY
Jesse R. Langley
ATTORNEY.

Patented July 31, 1934

1,968,275

UNITED STATES PATENT OFFICE 1,968,275

TREATMENT OF GAS

Philip J. Wilson, Jr., Edgeworth, Pa., assignor to The Koppers Company of Delaware, a corporation of Delaware Application March 28, 1931, Serial No. 525,976

9 Claims. (Cl. 202—30)

My invention relates to the treatment of fuel gases such as coal gas, coke oven gas, mixed gas, and the like, and especially to the disposal of phenolate solution produced in the dephenolization of gas liquor obtained from such gases.

At plants where fuel gas is manufactured by carbonizing coal and analogous processes, ammoniacal gas liquor is produced during the purification of the gas from tar and ammonia. This gas liquor contains free and fixed ammonia, and usually contains tar acids amounting to from 0.5 to 5.0 grams per liter. The tar acids present include phenol and its homologues, such as the cresols and xylenols, but they are usually determined as phenol and referred to as phenol or phenols.

When gas liquor is distilled in the ordinary manner for the recovery of ammonia, a major portion of the phenols remains in the ammonia still waste. Since discharge of still waste containing phenols is undesirable and in many instances prohibited, it has become necessary at most gas plants to dephenolize the gas liquor prior to its discharge as still waste, and preferably before liming the liquor or otherwise treating it to liberate fixed ammonia.

Several dephenolization processes have been devised in the past, and these processes serve to more or less completely remove tar acids from the gas liquor so that after removal of ammonia the still waste may be discharged as desired, substantially without danger of phenolic pollution of streams. In these processes, the liquor is contacted with a transfer agent which removes phenols from the liquor, and the transfer agent is then contacted with an absorbent for tar acids, which is preferably a solution containing caustic soda or some other suitable alkali.

A variety of transfer agents has been used successfully in these dephenolizing processes, and these are used at various stages in the treatment of the gas liquor. When dephenolization is accomplished by the vapor recirculation process, for example, as described by J. A. Shaw in a copending application Serial No. 230,570, filed November 2, 1927, the liquor is first distilled for the removal of free ammonia and other volatile constituents and is then treated with a hot vapor or gas which is recirculated through the liquor and through an absorbent for phenols, such as caustic soda solution.

In other processes, the gas liquor is washed with benzol, kerosene, or other immiscible solvents for tar acids before distillation. The solvent is then washed with caustic soda solution or the like to remove tar acids, and may then be recirculated to dephenolize further quantities of liquor, if desired.

Regardless of the stage in the treatment of gas liquor at which dephenolization is practiced, and of the type of transfer agent used, the tar acids removed from the liquor are transferred to an alkaline absorbent solution in which they react to form salts, such as sodium phenolate. This phenolate solution must then be disposed of in the most economical manner.

A common method of disposing of the phenolate is to spring it, preferably by contacting it with flue gas or other gas containing carbon dioxide. Phenols are thereby liberated and recovered in salable form, and a carbonate solution is produced which may be utilized in neutralizing acid-washed light oil, as described by I. H. Jones in a copending application Serial No. 531,979, filed Apr. 22, 1931, (Case No. 427), or it may be returned to the flushing liquor system, as described by J. A. Shaw in a copending application Serial No. 526,055, filed March 28, 1931, (Case No. 321), or otherwise disposed of.

The amount of phenolate produced at many plants is small, however, and in some instances the cost of springing it and recovering phenols exceeds the return from the sale of the phenols recovered. The phenolate cannot be wasted, as in most cases it would then find its way into water courses and contaminate them with phenol. Furthermore such wasting would be undesirable economically, as no return would be received for the alkalinity of the phenolate solution.

An object of my present invention is to provide a process wherein phenolate solution produced by dephenolizing gas liquor is economically utilized.

A second object of my invention is to provide an improved process of recovering ammonia from fuel gas without discharging waste liquids contaminated with tar acids.

My invention has for further objects such other advantages and results as obtain in the process and apparatus hereinafter described and claimed.

In the practice of my present invention, crude fuel gas such as coke oven gas is cooled and partially condensed in the usual manner to produce gas liquor. This gas liquor is dephenolized in any suitable manner and phenolate solution is thereby produced. The liquor is also distilled for the recovery of ammonia, and ammonia still waste substantially free from tar acids is discharged for any desired disposal.

It is to be understood that the term "phenolate"

is intended to include salts of tar acids other than phenol, such as the cresols. These are usually sodium salts, but may be salts of other alkali metals, such as potassium. Furthermore, the phenolate solution may contain unconverted alkali, such as sodium hydroxide, and relatively small amounts of other salts, such as sodium sulphide and carbonate, which are formed by reaction with constituents of the gas liquor and/or the transfer agent.

Phenolate solution is withdrawn from the dephenolizer and returned to the hot drain tank or the gas cooling system, preferably at a point in the flushing liquor system. It is then brought into contact with the gas along with the flushing liquor, and the phenolate is decomposed by acidic constituents of the crude gas, such as $CO_2$, into phenol and sodium carbonate and bicarbonate. The phenol is almost entirely taken up by tar condensed from the gas, and by the gas itself, and the carbonates convert fixed ammonium compounds to free ammonia, thereby decreasing the amount of lime required for that purpose during subsequent distillation of the gas liquor.

Instead of adding the phenolate to the flushing liquor, I may add it to any other liquor circulated in contact with the gas, such as the cooling liquor in the primary cooler system, and obtain similar results.

I now describe with reference to the accompanying drawing a preferred method of practicing my improved process of treating gas to recover ammonia therefrom without producing phenol-containing effluents. In the drawing, The single figure is a somewhat diagrammatic view, partly in elevation and partly in vertical section, of apparatus suitable for the practice of my present invention.

Coke oven gas is produced in a coke oven 1, which is usually one of a battery of similar ovens, and passes through an ascension pipe 2 into a hydraulic main or collecting main 3. In this main the gas is contacted with flushing liquor which cools the gas and condenses certain constituents such as tar and fixed ammonia compounds therefrom. The gas and the condensate and flushing liquor pass through an offtake 4 into a pitch trap 5.

In the pitch trap 5 the gas separates from the liquids present and passes from the top of the trap 5 through a pipe 6 into a primary cooler 8. Here the gas is further cooled and further condensation takes place. The gas then passes from the cooler 8 through a pipe 9 for further purification or other disposal.

Flushing liquor and condensate from the gas, after separating from the gas in the pitch trap 5 flow through a pipe 11 into a hot drain tank 12. In this tank aqueous liquids are separated from tar, which settles to the bottom of the tank and may be withdrawn through a pipe 14. The aqueous liquid containing tar acids and free and fixed ammonia overflows from the hot drain tank through a pipe 15 into a flushing liquor circulating tank 16.

Tar and the like which separate from the liquor in this tank 16 may be withdrawn through a pipe 17. Liquor is withdrawn from the tank by a pump 18, and recirculated through a pipe 19 into the collecting main 3 and/or the ascension pipes 2, where it cools further quantities of gas. Excess flushing liquor overflows from the tank 16 into a trench 21 or other suitable collecting means.

Cooling liquor is withdrawn from the bottom of the primary cooler 8 with the condensate from the gas and flows through a pipe 23 into a cooling liquor circulating tank 24, from which tar and the like may be drained through a pipe 25. The cooling liquor is withdrawn from this tank by a pump 26, and recirculated through a cooler 27 and a pipe 28 into the primary cooler 8, where it cools and partially condenses a further quantity of gas. Excess liquor overflows from tank 24 into the collecting trench 21. From the trench 21 ammoniacal gas liquor passes through a pipe 30 into an ammonia liquor storage tank 31.

If desired, the tank 24 may be omitted, and recirculation and discharge of excess cooling liquor then take place from a sump or well in the bottom of the primary cooler 8. Likewise the collecting trench 21 may be omitted, and effluents from the flushing system and the primary cooler system then pass directly to the ammonia liquor storage tank 31. In any case, the ammonia liquor or gas liquor in tank 31 is then ready for treatment for the recovery of ammonia and the removal of tar acids.

In the present instance dephenolization by the vapor recirculation process is described. Liquor is withdrawn from the storage tank 31 by a pump 33 and delivered through a pipe 34 into a free ammonia still 35 which is part of an installation of the usual type for the recovery of ammonia. The liquor passes downwardly through this free still 35 in countercurrent with steam or other hot vapor, which removes free ammonia and other volatile constituents from the liquor and carries them from the still through a vapor pipe 37.

The liquor substantially free from free ammonia flows from the bottom of the free still 35 through a pipe 38 to a surge tank or vent tank 39. From this tank it is withdrawn by a pump 40 and delivered through a pipe 41 and sprays or other suitable distributing devices 42 into the ammonia liquor section or stripping section 44 of a dephenolizer 45 of the vapor recirculation type.

The hot liquor passes downwardly over suitable contact material such as wooden hurdles or spiral tile packing 46 in this section 44 of the dephenolizer, and tar acids are removed by an upward flow of vapor or saturated gas which is preferably maintained at a temperature near the boiling point of the liquor.

The dephenolized liquor then passes from the bottom of this section of the dephenolizer through a pipe 48 into a liming chamber 49, which is preferably located beneath the free ammonia still 35. In this chamber 49 the liquor is mixed with lime or other suitable alkaline material introduced through a pipe 51 which serves to liberate fixed ammonia. The lime and liquor are mixed and heated if necessary by steam supplied through a pipe 52.

The liquor then passes from the liming chamber 49 through a pipe 54 into a fixed ammonia still 55. Here the liquor is further distilled with steam supplied through a pipe 57. This steam passes upwardly through the liquor removing ammonia therefrom, and then passes from the fixed still through a pipe 59 into the bottom of the free still 35. Still waste substantially free from ammonia and tar acids is discharged from the bottom of the fixed still through a pipe 61 for any desired disposal.

The enriched gas or vapor passes from the stripping section 44 of the dephenolizer 45 containing the tar acids removed from the liquor, and continues downwardly through a pipe 63 to a blower 65, which recirculates it into the absorbing stage 66 of the dephenolizer. This absorbing stage consists of one or more sections in which the vapor is contacted with an alkaline absorbent for tar acids, which is preferably caustic soda solution.

In the present instance the absorbing stage consists of only one such section, 66, to which caustic soda solution is supplied from a tank 68 by a pump 69, preferably intermittently. During its passage downward through the steel turnings 71 or other contact material with which this section of the dephenolizer is packed, the caustic absorbs phenols from the recirculated vapor to form sodium phenolate. This phenolate solution collects in the bottom of the dephenolizer and flows through a pipe 73 into a phenolate storage tank 74.

From this tank the phenolate is withdrawn by a pump 75 and delivered to a suitable point in the gas cooling system. For example, the phenolate may pass through a pipe 76 into the hot drain tank 12, or through pipes 76 and 77 into pipe 19 where it is mixed with flushing liquor and then enters the collecting main 3, or through pipes 76 and 78 into the primary cooler circulating system.

In the flushing system or the primary cooler system, the acidic constituents of the gas, such as carbon dioxide, react with the phenolate to liberate phenols and to form salts such as sodium carbonate and bicarbonate. The major portion of the liberated phenols passes into the tar. In fact, this takes place so completely that I have found in practice that there is no determinable difference between the average tar acid content of the liquor discharged to storage tank 31 when this procedure is followed and the tar acid content of the liquor when the phenolate is not returned to the gas cooling system.

I have found, however, that the uncombined caustic in the phenolate solution, and/or the sodium carbonates formed by reaction with $CO_2$ in the gas, react with fixed ammonium compounds in the liquor to convert ammonia therein to the free form. The amount of lime or other alkaline material required for that purpose in the liming chamber 49 is thereby considerably reduced.

It will be obvious to those skilled in the art that various modifications can be made in the several parts of my apparatus and the several steps of my process without departing from the spirit of my invention, and it is my intention to cover in the claims such modifications as are included within the scope thereof.

I claim as my invention:

1. The process of treating fuel gas containing $CO_2$ and tar acid, which comprises: cooling the gas and removing therefrom tar and ammoniacal gas liquor containing tar acid, then transferring the tar acid by means of a transfer agent from the liquid to an alkaline solution that is in a zone separate from the liquid in which separate zone it reacts to form phenolate, and bringing the phenolate from the separate zone into contact with a further quantity of gas containing $CO_2$ and tar in the aforesaid gas cooling tar and ammoniacal gas liquor removal step and thereby removing the tar acid from the phenolate with said $CO_2$ and tar.

2. The process of treating fuel gas containing ammonia, $CO_2$, tar and tar acid, which comprises: cooling the gas and removing therefrom tar and ammoniacal gas liquor containing tar acid, separating the tar from the gas liquor, contacting the separated gas liquor in a separate zone with an inert transfer medium and transferring by said inert medium the tar acid from the gas liquor to an alkaline solution in a separate zone in which it reacts to form phenolate, and bringing the phenolate into contact with a further quantity of said gas in the aforesaid gas cooling and removal step and thereby liberating the tar acid from the phenolate with the $CO_2$ of the gas, and removing the liberated tar acid from the gas with the tar being removed therefrom and subsequently separated from the gas liquor as aforesaid.

3. The process of treating gas containing ammonia and tar acid, which comprises: cooling the gas and removing therefrom ammoniacal gas liquor containing tar acid, contacting the gas liquor in a separate stage with a tar acid transfer agent and then transferring tar acid from the gas liquor in said stage to an alkaline solution in a separate stage in which it reacts to form phenolate, bringing the phenolate from said separate stage into contact with gas containing tar and acidic constituents, causing the phenolate to react with the acidic constituents of said gas to liberate the tar acid, absorbing the liberated tar acid from the gas with the tar in said gas and removing the tar therefrom.

4. The process of treating fuel gas containing ammonia, acidic constituents, tar and tar acid, which comprises: cooling the gas and removing therefrom tar and ammoniacal gas liquor containing tar acid, separating the tar from the ammonia liquor, contacting the separated ammonia liquor in a separate zone with an inert transfer agent for tar acid and then transferring tar acid by means of said inert transfer agent from the gas liquor to an alkaline solution in a separate zone in which it reacts to form phenolate, bringing the phenolate from said separate zone into contact with the aforesaid gas in said cooling step and causing the phenolate to react with the acidic constituents of said gas to liberate tar acid during the aforesaid step for cooling and removal of ammonia gas liquor and tar from the gas and thereby causing the liberated tar acid to be taken up by the tar being removed from the gas for separation from the gas liquor.

5. The process of treating fuel gas containing ammonia, $CO_2$, tar and tar acid, which comprises: cooling the gas and removing therefrom tar and ammoniacal gas liquor containing tar acid, transferring tar acid from the gas liquor to an alkaline solution in a separate zone in which it reacts to form alkali phenolate, and conveying the phenolate to said cooling step to react with carbon dioxide contained in the gas in said cooling step to decompose the phenolate, thereby liberating the tar acid and forming alkali carbonate, and removing the so liberated tar acid from the process with the tar being removed from the gas in said cooling step.

6. In a process comprising: cooling fuel gas containing acidic constituents and removing therefrom tar and ammoniacal gas liquor, and subsequent cooling of the gas with liquid producing tar acid therein the improvement comprising: transferring the tar acid from the liquid of said subsequent cooling step with an inert transfer medium to an alkaline solution in a separate zone in which it reacts to form phenolate, and bringing the phenolate from said separate zone into contact with said gas in the first aforesaid cooling step, and thereby liberating the tar acid with the acidic constituents and removing them with the tar being removed from the gas.

7. The process of treating fuel gas which comprises: cooling fuel gas containing tar, $CO_2$, ammonia, and tar acid, and removing therefrom tar and ammoniacal gas liquor containing tar acid, transferring tar acid with an inert transfer gas from the gas liquor to an alkaline solution in a separate zone from the gas liquor in which it reacts to form alkaline phenolate, bringing the alkaline phenolate from the separate zone into the gas in the aforesaid cooling step, and causing the phenolate to react with $CO_2$ constituents of said gas in said cooling step to liberate the tar acid therein and to convert ammonia contained as fixed ammonium compounds in said cooling step to the free form.

8. The process of treating fuel gas containing $CO_2$, ammonia and tar acid which comprises: cooling the gas with an aqueous liquid and thereby removing from the gas tar and ammoniacal gas liquor containing tar acid by means of a transfer agent, transferring tar acid from the gas liquor to an alkaline solution that is in a zone separate from the liquid in which separate zone it reacts to form alkaline phenolate, and adding the phenolate to the aqueous liquid and contacting it with a further quantity of gas in the aforesaid gas cooling, tar and ammoniacal gas liquor removal step and thereby transferring the tar acid of the phenolate to the tar, and removing the tar containing the transferred tar acid from the process.

9. The process of treating fuel gas containing ammonia, tar, and tar acid, which comprises: recirculating an equeous liquid into and out of contact with the gas to condense tar and ammoniacal gas liquor therefrom, separating tar from the gas liquor of said recirculation, contacting, in another zone, gas liquor from the recirculating aqueous liquid with an inert tar acid transfer agent, transferring the transfer agent containing the tar acid from said other zone to an alkaline solution in a separate zone in which the tar acid reacts to form phenolate, and bringing the phenolate from said separate zone into contact with a further quantity of said gas in the treatment thereof as aforesaid to condense tar and ammonia gas liquor and thereby transferring the tar acid of the phenolate to the tar that is being condensed and that is subsequently separated from the gas liquor of said recirculation, to remove the tar acid from the process.

PHILIP J. WILSON, JR.